| United States Patent [19] | [11] | 4,104,272 |
|---|---|---|
| Pettelkau | [45] | Aug. 1, 1978 |

[54] PROCESS FOR THE PRODUCTION OF CONCENTRATED POLYCHLOROPRENE LATICES

[75] Inventor: Hans-Jürgen Pettelkau, Burscheid, Germany

[73] Assignee: Bayer Aktiengesellschaft, Fed. Rep. Germany

[21] Appl. No.: 682,359

[22] Filed: May 3, 1976

[30] Foreign Application Priority Data

May 7, 1975 [DE] Fed. Rep. of Germany ....... 2520339

[51] Int. Cl.² .............................................. C08L 93/00
[52] U.S. Cl. ............................... 260/27 BB; 252/356; 260/29.7 R; 260/29.7 PT

[58] Field of Search ....... 260/27 BB, 23.7 H, 29.6 M, 260/29.6 R, 33.6 R; 526/17, 295; 252/8.5 A, 8.5 C, 8.5 P, 89

[56] References Cited

U.S. PATENT DOCUMENTS

| 3,824,203 | 7/1974 | Tabibian | 526/295 |
| 3,838,140 | 9/1974 | Mayer-Mader | 526/295 |

*Primary Examiner*—Melvyn I. Marquis
*Attorney, Agent, or Firm*—Connolly and Hutz

[57] ABSTRACT

Objects of the invention are an emulsifier composition suitable for the production of polychloroprene latices as well as a process for polymerizing chloroprene to form a concentrated polymer latex.

5 Claims, No Drawings

PROCESS FOR THE PRODUCTION OF CONCENTRATED POLYCHLOROPRENE LATICES

This invention relates to a process for the production of concentrated polychloroprene latices by polymerising chloroprene or copolymerising chloroprene with suitable comonomers in an aqueous-alkaline emulsion in the presence of alkali salts of disproportionated abietic acid or a mixture of the alkali salts of disproportionated abietic acid and fatty acids, non-ionic emulsifiers and conventional initiators.

Polychloroprene latices with solids contents of from 50 to 60% by weight are extensively used, for example as binders for fibres of all kinds, for the production of special dipcoated articles or for modifying bitumen emulsions (cf. H. Esser; Baypren latices and their industrial application; Gummi, Asbest, Kunststoffe, 1973, Nos. 5–7, pages 394–398, 494–503, 574–582).

Polychloroprene latices are normally produced by a two-stage process. The first stage comprises polymerising latices with low solids contents which, in the second stage known as "creaming", are concentrated in known manner, for example in accordance with U.S. Pat. No. 2,405,724, by the addition of creaming agents, for example alginates, or by concentration through evaporation or similar techniques. Unfortunately, this process is attended by some serious disadvantages. The critical stage of the production cycle so far as output is concerned is the creaming stage for which considerable tank volume is required. In addition, valuable quanties of product are lost through polymer remaining behind in the serum. Elimination of the serum in a biological treatment plant involves considerable costs and is encountering increasing difficulties.

The production of latices with solids contents of from 40 to 60% by weight in a single-stage process is shown and is also standard procedure in the case of numerous monomers and monomer mixtures (Houben-Weyl, Methoden der organischen Chemie, Vol. XIV/1, Makromolekulare Stoffe, Part 1, Georg Thieme Verlag, Stuttgart, 1961, pages 333 et seq).

Unfortunately, reducing water content in the aqueous-alkaline emulsion polymerisation of chloroprene with radical initiators gives rise to considerable problems. Where approximately 55 to 95 parts of water are used per 100 parts of chloroprene, polymerisation passes through a viscous phase in which mixing of the emulsion is greatly impeded. Dissipation of the heat of polymerisation is thus complicated and, in view of the extremely high polymerisation velocity of chloroprene, the reaction is in danger of becoming uncontrollable. According to R.E. Burk, Ind. Eng. Chem. 30, 1054 (1938), the polymerisation velocity of chloroprene is for example about 700 times greater than that of isoprene.

The polymerisation velocity can be slowed down by reducing the quantity of emulsifier (F. Hölsher, Dispersionen synthetischer Hochpolymerer, Teil I, Eigenschaften, Herstellung und Prüfung, [Dispersions of Synthetic High Polymers, Part I, Properties, Production and Testing], Springer-Verlag, Berlin-Heidelberg-New York, 1969, pages 81 et. seq.). The minimum quantity of emulsifier is determined by the stability of the monomer emulsion before initiation and by the colloidal stability of the emulsion during the polymerisation reaction and of the latex after the polymerisation reaction. In addition, the concentration of initiator and the polymerisation temperature have a significant bearing upon the polymerisation velocity.

German Offenlegungsschrifts Nos. 2,008,674 and 2,047,450 describe processes for the production of high-solids chloroprene polymer latices. The above-mentioned difficulties during polymerisation (viscosity, dissipation of heat and colloidal stability) are alleviated by using potassium salts or a mixture of the potassium and sodium salts of the emulsifiers and dispersants, and by maintaining certain, strictly defined concentration ranges of the surface-active substances, to such an extent that the reaction is controllable and polymerisation can be carried out.

However, the trouble-free completion of the reaction, as described in these two Offenlegungsschrifts, requires the strict maintenance of concentration ranges for the dispersant. A condensation product of naphthalene sulphonic acid and formaldehyde is used as the dispersant, the dispersant being employed in quantities of up to 2.5 parts by weight (based on 100 parts of monomer).

The condensation product of naphthalene sulphonic acid and formaldehyde normally contains up to 30% by weight of sodium sulphate as a result of the production conditions. However, this quantity of salt reduces the stability of the latex by approaching the electrolyte threshold value, beyond which coagulation occurs. Since, according to German Offenlegungsschrift No. 2,008,674 and German Offenlegungsschrift No. 2,047,450, up to 2.5 parts of the condensation product of naphthalene sulphonic acid and formaldehyde are used, an appreciable "salt effect" can be expected.

Influencing and sampling the violent polymerisation of chlorprene by way of the viscosity of the emulsion in accordance with German Offenlegungsschrifts Nos. 2,008,647 and 2,047,450 is only indirect and unsatisfactory.

According to the present invention, the aforementioned difficulties encountered in the reaction of chloroprene in aqueous-alkaline emulsions are eliminated by using a particular emulsifier system.

Accordingly, the present invention provides a process for the polymerisation of chloroprene, which may contain up to 50% by weight of a comonomer, to form concentrated polymer latices in an aqueous-alkaline emulsion, which contains from 55 to 95 parts of water per 100 parts of monomer, in the presence of alkali salts of disproportionated abietic acid or a mixture of the alkali salt of disproportionated abietic acid and the alkali salts of saturated and/or unsaturated fatty acids containing from 6 to 25 carbon atoms, and non-ionic emulsifiers, which is characterised by the fact that (a) an alkali salt of disproportionated abietic acid, in a quantity of from 2.0 to 6.0 parts by weight per 100 parts by weight of monomer, or (b) a mixture of an alkali salt of disproportionated abietic acid, in a quantity of from 1.5 to 4.0 parts by weight, and of alkali salts of fatty acids with a chain length of from 6 to 25 carbon atoms, in a quantity of from 0.05 to 3.0 parts by weight per 100 parts by weight of monomer, and (c) non-ionic emulsifiers, in quantities of from 0.01 to 1.0 parts by weight per 100 parts by weight of monomer, are used as emulsifiers.

The sodium or potassium salts are mentioned as examples of alkali salts of disproportionated abietic acid. The disproportionated abietic acids themselves and their production are described in U.S. Pat. Nos.

2,154,629 and 2,201,237. They are obtained, for example, by disproportionating wood rosins such as, for example, colophony.

The sodium or potassium salts are mentioned as examples of alkali salts of saturated and/or unsaturated fatty acids. The following compounds are mentioned as examples of fatty acids containing from 6 to 25 carbon atoms: caproic acid, caprylic acid, capric acid, lauric acid, myristic acid, palmitic acid, stearic acid, arachic acid, behenic acid, caproleic acid, lauroleic acid, oleic acid, eladic acid, eicos noic acid, erucic acid, linoleic acid.

The non-ionic emulsifiers slow down the polymerisation reaction and, in addition, almost completely suppress coagulation during polymerisation, which has a particularly positive effect in cases where the process is carried out continuously.

More particularly, the following classes of compounds are mentioned by way of example:

(a) ethylene oxide or propylene oxide adducts of substituted phenols or alcohols corresponding to formulae (I) and (II):

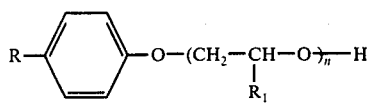
(I)

where

R is a branched chain and/or straight chain $C_1$-$C_{20}$ alkyl radical, a phenyl radical and/or a phenyl radical alkyl-substituted one or more times by $C_1$-$C_{20}$ carbon atoms in the alkyl chain, $R_1$ represents a hydrogen atom or a methyl group, and $n$ is a number from 1 to 30,

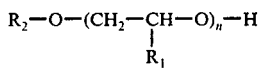
(II)

where $R_2$ represents a branched chain and/or straight chain, saturated and/or unsaturated alkyl radical with 10 to 30 carbon atoms, and $R_1$ and $n$ have the same meaning as in formula (I). The following compounds ae mentioned in particular:

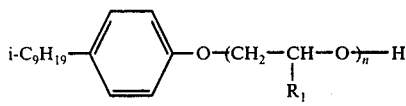

where $n$ = 2 to 30;

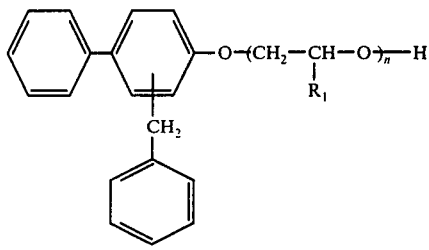

where $n$ = 2 to 30;

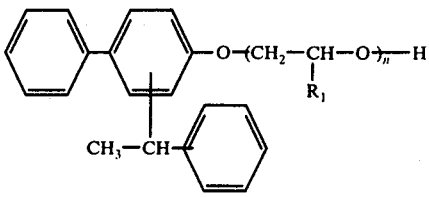

where $n$ = 2 to 30;

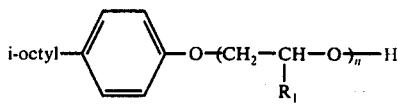

where $n$ = 2 to 30;

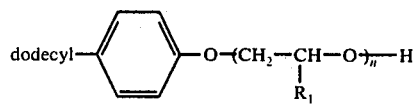

where $n$ = 2 to 30;

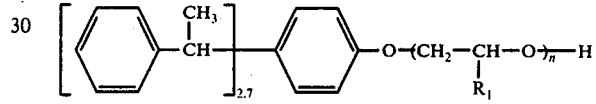

where $n$ = 2 to 30;

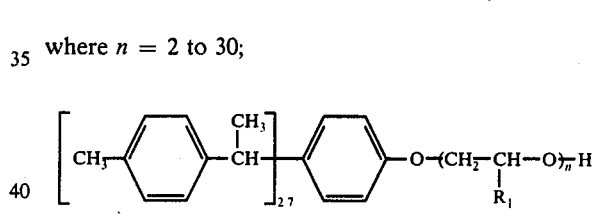

where $n$ = 2 to 30;

(b) Alkylene oxide or propylene oxide reaction products with cetyl alcohol, lauryl alcohol, stearyl alcohol, decyl alcohol, oleyl alcohol, the alkylene oxide units amounting to between 2 and 30 in each case;

(c) fatty acid polyoxalkylates of the formula R CO———(O—$CH_2$—$CH_2$)$_m$OH, in which the radical R represents $C_nH_{2n+1}$, $C_{n_1}H_{2n_1-1}$, $C_{n_2}H_{2n_2-3}$, $n$ is a number from 6 to 25, $n_1$ and $n_2$ are numbers from 9 to 23 and $m$ is a number from 1 to 30.

Lauric acid, oleic acid and stearic acid are mentioned as examples of fatty acids.

(d) Fatty acid amide polyoxalkylates of the formula

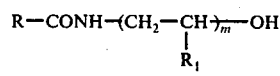

in which R represents a radical R already defined under (c), $n$ is a number from 6 to 25 and $m$ is a number from 2 to 30.

Stearic acid, palmitic acid and oleic acid are mentioned as example of the acid component.

In all the above formulae, the radical $R_1$ represents hydrogen or methyl.

Polymerisation is carried out in known manner in the form of emulsion polymerisation either continuously or in batches.

In order to produce a latex with a high solids content, from 55 to 95 parts by weight of water are added per 100 parts of monomer.

The polymerisation initiators used are the known compounds which produce free radicals, for example hydrogen peroxide, water-soluble salts of persulphuric acid, organic peroxides (p-menthanehydroperoxide, benzoyl peroxide, lauryl peroxide and tert.-butyl hydroperoxide) and, with particular advantage, formamidine sulphinic acid in accordance with German Auslegeschrift No. 1,097,689.

Polymerisation may be carried out at temperatures in the range from 30° to 70° C, although it is preferably carried out at temperatures in the range from 45° to 55° C.

The use of the described emulsifier systems requires pH-values of the emulsion of greater than 10, a pH-range from 12.0 to 13.5 being particularly favourable.

The cold setting point of the latices thus prepared does not have to be corrected on completion of polymerisation.

In order to provide the latex with high colloidal stability, it is of particular advantage to use from 0.1 to 0.5 part by weight of the non-ionic emulsifier (based on 100 parts of monomer).

In every case, the monomer conversion amounts to more than 90%. The solids content of the latex usually varies between 50 and 65% by weight, based on the quantity of water used.

Unreacted organic compounds can be removed by steam distillation, for example at 50° C and under an absolute pressure of 20 Torr.

In carrying out the process, chloroprene may be polymerised on its own or may be replaced by up to 50% with another compound copolymerisable with chloroprene for example, monovinyl compounds (acrylonitrile, methacrylonitrile, vinylidene chloride, α-chloroacrylonitrile, methacrylic acid esters, acrylic acid esters), vinyl-substituted aromatic, compounds (styrene, vinyl toluenes) and conjugated diene compounds (1,3-butadiene, 1-chloro-1,3-butadiene, 2,3-dichloro-1,3-butadiene, 2-chloro-3-methyl-1,3-butadiene).

The structure and properties of the polymers may be varied within wide limits by the addition of known modifying compounds, for example, mercaptans, xanthogen disulphides, benzyl iodide and iodoform.

The invention is illustrated by the following Examples.

Chloroprene stabilised against spontaneous polymerisation with about 100 to 150 ppm of phenothiazine or a corresponding monomer mixture was used as starting material in the described tests.

The solids content is determined by removing water and other volatile components from a previously weighed sample at 120° C in a vacuum drying cabinet. The weight of the dry sample is determined and the solids content expressed in percent, based on the weight of the original sample.

EXAMPLE 1

A monomer phase (M) and an aqueous phase (W) were combined and emulsified:

| W: Aqueous Phase | |
|---|---|
| deionised water | 60.0 parts by weight |
| Na-salt of a disproportionated abietic acid (70% by weight solids content) | 5.0 parts by weight |
| Na-salt of oleic acid (100% solids content) | 0.25 part by weight |
| caustic soda | 0.60 part by weight |
| adduct of i-nonylphenol and 10 mols of ethylene oxide | 0.30 part by weight |
| M: Monomer Phase | |
| Chloroprene | 100.0 parts by weight |
| n-dodecyl mercaptan | 0.08 part by weight |
| phenothiazine | 0.01 part by weight |

Polymerisation was carried out under nitrogen in about 5 hours at temperatures of from 42° to 44° C. The initiator used was a 2.5% aqueous solution of formamidine sulphinic acid which flowed continuously into the polymerisation mixture. The input of initiator was regulated according to the reaction temperature.

After about 6 hours, the temperature prevailing in the reaction vessel was raised for 1 hour to 50° C in order to accelerate polymerisation of the residual monomer.

The polymerisation mixture was then degassed at about 20 Torr and the latex cooled to room temperature. The latex had a solids content of approximately 59% by weight. The conversion amounted to 99%. No coagulate was formed during polymerisation. The latex was left standing for 1 month. There was no evidence of any colloidal instability or sedimentation.

EXAMPLE 2

| W: Aqueous Phase | |
|---|---|
| deionised water | 60.0 parts by weight |
| Na-salt of a disproportionated abietic acid (70% solids content) | 4.0 parts by weight |
| caustic soda | 0.6 part by weight |
| adduct of i-nonylphenol and 10 mols of ethylene oxide | 0.05 part by weight |
| M: Monomer phase | |
| chloroprene | 100.000 parts by weight |
| n-dodecyl mercaptan | 0.050 part by weight |
| phenothiazine | 0.005 part by weight |

The reaction was carried out in the same way as described in Example 1.

The latex had a solids content of approximately 58% by weight. No coagulate was formed during polymerisation. The conversion amounted to 99%. The latex did not show any sign of sedimentation or colloidal instability after standing for 1 month.

EXAMPLE 3

| W: Aqueous phase | |
|---|---|
| deionised water | 90.00 parts by weight |
| Na-salt of a disproportionated abietic acid (70% solids content) | 7.00 parts by weight |
| caustic soda | 0.80 part by weight |
| trisodium phosphate | 0.50 part by weight |
| potassium peroxy disulphate | 0.05 part by weight |
| adduct of i-nonylphenol and 10 mols of ethylene oxide | 0.20 part by weight |
| M: Monomer phase | |
| chloroprene | 50.00 parts by weight |
| 2,3-dichloro-1,3-butadiene | 50.00 parts by weight |
| phenothiazine | 0.02 part by weight |
| n-dodecyl mercaptan | 0.05 part by weight |

Polymerisation was carried out under the same conditions as in Example 1, except that the polymerisation temperature fluctuated between 48° and 50° C. In addition, the polymerisation of residual monomer was carried out over a period of 1 hour at 50° C. The latex had a solids content of approximately 50% by weight. The conversion amounted to 99%. No coagulate was formed during polymerisation. The latex did not show any sign of sedimentation or colloidal instability after standing for one month.

EXAMPLE 4

This Example is intended to demonstrate that even unstabilised chloroprene can be polymerised without difficulty using the emulsifier system according to the invention.

Chloroprene was freed from its stabiliser, for example phenothiazine, under nitrogen in a column of fuller's earth.

Polymerisation was carried out in the same way as described in Examples 1 and 2.

A monomer phase (M) and an aqueous phase (W) were emulsified under nitrogen.

| W: | Aqueous phase | |
|---|---|---|
| | deionised water | 55.00 parts by weight |
| | Na-salt of disproportionated abietic acid (70% solids content) | 3.80 parts by weight |
| | caustic soda | 0.55 part by weight |
| | adduct of benzyl phenyl phenol and 14 mols of ethylene oxide | 0.01 part by weight |
| M: | Monomer phase | |
| | Chloroprene | 100.00 parts by weight |
| | n-dodecylmercaptan | 0.05 part by weight |

After the emulsion had been heated to 40° C, polymerisation began immediately following the addition of a small quantity of activator solution (2.5% aqueous formamidine sulphinic acid). The internal temperature did not rise beyond 45° C. The polymerisation temperature was then kept between 42° C and 45° C by regulating the input of activator solution, which flowed continuously into the polymerisation mixture, coupled with gentle cooling (temperature of the cooling medium 30°–40° C).

After a period of 5 hours, the conversion amounted to 90%. The polymerisation reaction was stopped by the addition of a chloroprene solution containing 0.7% by weight of phenothiazine and 0.7% by weight of tert-butyl pyrocatechol, and the residual monomer removed in the same way as described in the other Examples. The latex had a solids content of 57.6%.

No coagulate was formed during polymerisation. The latex did not show any sign of sedimentation or colloidal instability after standing for one month.

I claim:

1. A process for polymerizing chloroprene together with up to 50% by weight of a comonomer to form a concentrated polymer latex in aqueous alkaline emulsion containing from 55 to 95 parts of water per 100 parts of monomer, said process comprising carrying out said polymerization in the presence of an emulsifier having a pH greater than 10 and comprising
    (a) a non-ionic emulsifier in an amount of from 0.01 to 1.0 parts by weight per 100 parts by weight of monomer and either
    (b) an alkali metal salt of disproportionated abietic acid in an amount of from 2.0 to 6.0 parts by weight per 100 parts by weight of monomer or
    (c) a mixture of an alkali metal salt of disproportionated abietic acid in an amount of from 1.5 to 4.0 parts by weight per 100 parts by weight of monomer and an alkali metal salt of a fatty acid having a chain length of 6 to 25 carbon atoms in an amount of from 0.05 to 3.0 parts by weight per 100 parts by weight of monomer.

2. The process of claim 1 wherein said polymerization is continued to a monomer conversion of at least 90%.

3. The process of claim 1 wherein said polymerization is carried out at a temperature of from 0° to 70° C.

4. A polymer latex produced by the process of claim 1.

5. An emulsifier suitable for the production of a polychloroprene latex comprising
    (a) a non-ionic emulsifier in an amount of from 0.01 to 1.0 parts by weight per 100 parts by weight of monomer and either
    (b) an alkali metal salt of disproportionated abietic acid in an amount of from 2.0 to 6.0 parts by weight per 100 parts by weight of monomer or
    (c) a mixture of an alkali metal salt of disproportionated abietic acid in an amount of from 1.5 to 4.0 parts by weight per 100 parts by weight of monomer and an alkali metal salt of a fatty acid having a chain length of 6 to 25 carbon atoms in an amount of from 0.05 to 3.0 parts by weight per 100 parts by weight of monomer, said emulsifier having a pH greater than 10.

* * * * *